United States Patent
Yan et al.

(10) Patent No.: US 11,078,989 B2
(45) Date of Patent: Aug. 3, 2021

(54) REDUCTION GEAR AND ELECTROMECHANICAL DEVICE

(71) Applicant: NIDEC CORPORATION, Kyoto (JP)

(72) Inventors: Guo-Jhih Yan, Taipei (TW); Huu-Tich Ngo, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/594,099

(22) Filed: Oct. 7, 2019

(65) Prior Publication Data
US 2020/0132165 A1     Apr. 30, 2020

(30) Foreign Application Priority Data
Oct. 31, 2018   (CN) .......................... 201811286508.7

(51) Int. Cl.
| | | |
|---|---|---|
| *F16H 1/32* | (2006.01) | |
| *H02K 7/108* | (2006.01) | |
| *F16H 1/28* | (2006.01) | |
| *H02K 7/00* | (2006.01) | |
| *H02K 7/08* | (2006.01) | |
| *H02K 7/116* | (2006.01) | |
| *H02K 1/27* | (2006.01) | |

(Continued)

(52) U.S. Cl.
CPC ............... *F16H 1/28* (2013.01); *H02K 1/182* (2013.01); *H02K 1/2793* (2013.01); *H02K 7/003* (2013.01); *H02K 7/08* (2013.01); *H02K 7/116* (2013.01); *H02K 16/02* (2013.01); *F16H 57/08* (2013.01)

(58) Field of Classification Search
CPC .... F16H 1/28–48; F16H 57/021; F16H 57/08; F16H 2057/02034; F16H 2057/023; F16H 2001/2881; F16H 3/46; F16H 3/44; F16H 3/52; F16H 2200/2005; H02K 7/003; H02K 7/08; H02K 7/116; H02K 1/2793; H02K 16/02; H02K 1/182; H02K 21/14; H02K 21/41
See application file for complete search history.

(56) References Cited

U.S. PATENT DOCUMENTS

| | | | | |
|---|---|---|---|---|
| 1,563,945 A | * | 12/1925 | Apple | ..................... H02K 7/116 |
| | | | | 310/83 |
| 1,632,123 A | * | 6/1927 | Else | .......................... F16H 3/62 |
| | | | | 475/296 |

(Continued)

FOREIGN PATENT DOCUMENTS

| | | | |
|---|---|---|---|
| CN | 106208511 A | * | 12/2016 |
| WO | WO-2010027007 A1 | * | 3/2010 ............. H02N 2/004 |

*Primary Examiner* — Charles A Fox
*Assistant Examiner* — Farhana Pervin
(74) *Attorney, Agent, or Firm* — JCIPRNET

(57) ABSTRACT

A reduction gear and an electromechanical device are provided. The reduction gear has a motor and a speed reduction assembly. The motor has a first rotary shaft and a second rotary shaft which rotate around a central axis, a second rotor, a first rotor, a stator and a first motor housing; the speed reduction assembly has: a first gear, a second gear, a third gear, and an output shaft driven by the third gear; and the motor further has: a first bearing and a second bearing, the first bearing and the second bearing are located on two sides of the stator in an axial direction, and the first gear is located on one side, away from the stator, of the second rotor. According to the embodiments, the reduction gear which is small in size and high in drive capability may be obtained.

16 Claims, 13 Drawing Sheets

(51) Int. Cl.
*H02K 1/18* (2006.01)
*H02K 16/02* (2006.01)
*F16H 57/08* (2006.01)

(56) References Cited

U.S. PATENT DOCUMENTS

| | | | | |
|---|---|---|---|---|
| 9,496,776 B2* | 11/2016 | Woolmer | ............... | H02K 3/24 |
| 2012/0212085 A1* | 8/2012 | Fu | ....................... | H02K 21/24 |
| | | | | 310/58 |
| 2014/0125205 A1* | 5/2014 | Landfors | ............. | B60K 17/046 |
| | | | | 310/67 R |

* cited by examiner

REDUCTION GEAR AND ELECTROMECHANICAL DEVICE

CROSS-REFERENCE TO RELATED APPLICATION

This application claims the priority of China patent application serial no. 201811286508.7, filed on Oct. 31, 2018. The entirety of the above-mentioned patent application is hereby incorporated by reference herein and made a part of this specification.

BACKGROUND

Technical Field

The disclosure relates to the electromechanical field, and in particular, to a reduction gear and an electromechanical device.

Description of Related Art

An actuator combining a motor with a speed reducer is a key component for robot application. In order to obtain a larger torque output, the speed reducer needs to have a high speed reduction ratio so as to convert high-speed low torque output of the motor into low-speed high torque output.

In the related art, there are various solutions for combining the motor with the speed reducer. For example, in a first solution, the speed reducer is arranged inside the motor, the motor and the speed reducer share a common front cover, the motor and the speed reducer are arranged in series in an axial direction, and in this solution, the motor is designed as a radial flux motor. For another example, in a second solution, the motor is designed to have a cavity in the center, the speed reducer is mounted inside the cavity, and the motor is designed as an axial flux motor in this solution.

It should be noted that the above description of the background is merely provided for clear and complete explanation of the disclosure and for easy understanding by those skilled in the art. And it should not be understood that the above technical solution is known to those skilled in the art simply because it is described in the background of the disclosure.

The inventors of the disclosure have found that in existing motor and speed reducer combination solutions, larger sizes are often required in order to obtain higher drive capability. For example, in the aforementioned first solution, the motor and the speed reducer are combined in series in the axial direction, so that the overall thickness of the motor in the axial direction is increased. For another example, in the aforementioned second solution, in order to arrange the speed reducer inside a cavity of the motor, the outer diameter size of the motor is set to be larger.

SUMMARY

According to one aspect of the embodiments of the disclosure, the reduction gear is provided and has a motor 1 and a speed reduction assembly 2. The motor 1 has a first rotary shaft 16 and a second rotary shaft 15 which rotate around the central axis, a second rotor 14 and a first rotor 13 which are disposed on radial outer sides of the second rotary shaft 15 and the first rotary shaft 16 respectively, a stator 12 disposed between the second rotor 14 and the first rotor 13, and a first motor housing 11 disposed on an axial side, away from the stator 12, of the first rotor 13;

the speed reduction assembly 2 has a first gear 25 disposed on one side, away from the first rotor 13, of the second rotor 14, a second gear 21 or 40 and a third gear 23 or 41 which mesh with the first gear 25, and an output shaft 24 driven by the third gear 23;

the motor further has a first bearing 17 disposed on a radial inner side of the first rotary shaft 16, and a second bearing 18 disposed on a radial inner side of the second rotary shaft 15 or the output shaft 24, the first bearing 17 and the second bearing 18 are located on two sides of the stator 12 in an axial direction, and the first gear 25 is located on one side, away from the stator 12, of the second rotor 14.

According to another aspect of the embodiments of the disclosure, an electromechanical device is provided and has the reduction gear described on any aspect of the aforementioned embodiment.

With reference to the following description and drawings, the particular embodiments of the disclosure are disclosed in detail, and the principle of the disclosure and the manners of use are indicated. It should be understood that the scope of the embodiments of the disclosure is not limited thereto. The embodiments of the disclosure contain many alternations, modifications and equivalents within the scope of the terms of the appended claims.

BRIEF DESCRIPTION OF THE DRAWINGS

The drawings are included to provide further understanding of the disclosure which constitute a part of the specification and illustrate the exemplary embodiments of the disclosure, and are used for setting forth the principles of the disclosure together with the description. It is obvious that the accompanying drawings in the following description are some embodiments of the disclosure, and for those of ordinary skills in the art, other accompanying drawings may be obtained according to these accompanying drawings without making an inventive effort. In the drawings.

DESCRIPTION OF THE EMBODIMENTS

Figure 1:
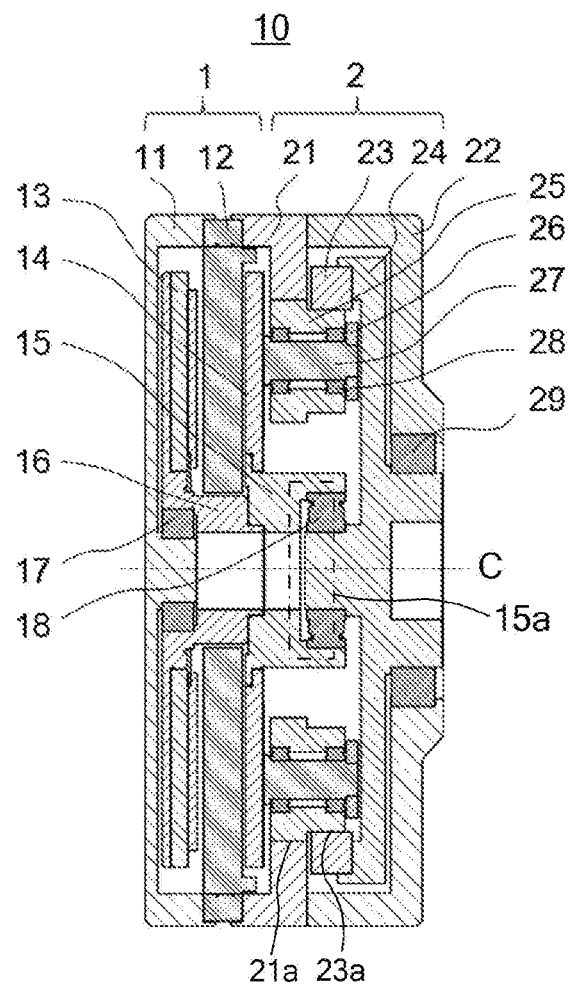
FIG. 1 is a schematic sectional view of a reduction gear in an axial direction according to embodiment 1 of the disclosure.

The exemplary embodiments of the disclosure provide a reduction gear and an electromechanical device. The reduction gear has a dual-rotor motor and a speed reduction assembly. Two bearings of the dual-rotor motor are arranged on two sides of a stator in an axial direction, and a gear of a speed reducer which is in serial arrangement with the dual-rotor motor in the axial direction is located on an radial outer side of one bearing close to the speed reduction assembly, so that the dual-rotor motor and the speed reducer may be compactly arranged in the axial direction and the radial direction, and accordingly the reduction gear which is small in size and high in drive capability is obtained. Meanwhile, a motor housing is not arranged between the dual-rotor motor and the speed reduction assembly, so that the number of mechanical parts may be decreased, accordingly the cost is reduced, and the axial size of the reduction gear is further reduced.

According to one aspect of the embodiments of the disclosure, the reduction gear is provided and has a motor 1 and a speed reduction assembly 2. The motor 1 has a first rotary shaft 16 and a second rotary shaft 15 which rotate around the central axis, a second rotor 14 and a first rotor 13 which are disposed on radial outer sides of the second rotary shaft 15 and the first rotary shaft 16 respectively, a stator 12 disposed between the second rotor 14 and the first rotor 13, and a first motor housing 11 disposed on an axial side, away from the stator 12, of the first rotor 13;

the speed reduction assembly 2 has a first gear 25 disposed on one side, away from the first rotor 13, of the second rotor 14, a second gear 21 or 40 and a third gear 23 or 41 which mesh with the first gear 25, and an output shaft 24 driven by the third gear 23;

the motor further has a first bearing 17 disposed on a radial inner side of the first rotary shaft 16, and a second bearing 18 disposed on a radial inner side of the second rotary shaft 15 or the output shaft 24, the first bearing 17 and the second bearing 18 are located on two sides of the stator 12 in an axial direction, and the first gear 25 is located on one side, away from the stator 12, of the second rotor 14.

According to one aspect of the embodiments of the disclosure, the second rotary shaft 15 has a first concave portion, and the second bearing 18 is located inside the first concave portion.

According to one aspect of the embodiments of the disclosure, on a side back on to the first motor housing 11, an end face of the second rotary shaft 15 is farther away from the first motor housing 11 than an end face of the second bearing 18, or, the end face of the second rotary shaft 15 coincides with the end face of the second bearing 18.

According to one aspect of the embodiments of the disclosure, the output shaft 24 has a second concave portion on a radial inner side, and the second bearing 18 is located in the second concave portion.

According to one aspect of the embodiments of the disclosure, on a side facing toward the first motor housing 11, an end face of the output shaft 24 is closer to the first motor housing 11 than an end face of the second bearing 18, or, the end face of the output shaft 24 coincides with the end face of the second bearing 18.

According to one aspect of the embodiments of the disclosure, supports 26 are further arranged between the output shaft 24 and the first gears 25 and abut against rotary shafts 27 of the first gears 25, the first gears 25 rotate around the rotary shafts 27, and the rotary shaft 27 are fixed to the second rotor 14.

According to one aspect of the embodiments of the disclosure, two or more first gears 25 are provided, and meanwhile, the two or more first gears 25 are disposed with the central axis as a center.

According to one aspect of the embodiments of the disclosure, the second gear 21 or 40 and the third gear 23 or 41 are ring gears or sun gears, and the first gears 25 are planet gears.

According to one aspect of the embodiments of the disclosure, when the second gear 21 and the third gear 23 are ring gears, an inner diameter of the second gear 21 and an inner diameter of the third gear 23 are the same or different; and when the second gear 40 and the third gear 41 are sun gears, an outer diameter of the second gear 40 and an outer diameter of the third gear 41 are the same or different.

According to one aspect of the embodiments of the disclosure, when the second gear 21 and the third gear 23 are ring gears, the reduction gear further has a fourth gear 30, and the fourth gear 30 is a sun gear and located on a radial inner side of the first gears 25.

According to one aspect of the embodiments of the disclosure, the reduction gear further has a collar 31 which is arranged at an end, facing the second rotor 14, of the second gear 21 and abuts against ends, facing the second rotor 14, of the first gears 25.

According to one aspect of the embodiments of the disclosure, the second bearing 18 is disposed on the radial inner side of the first gears 25, the second gear 21 or 40 and the third gear 23 or 41.

According to one aspect of the embodiments of the disclosure, the second bearing 18 is located between radial directions of the second rotary shaft 15 and the output shaft 24.

According to one aspect of the embodiments of the disclosure, the reduction gear is further provided with a center shaft 42 which is located on radial inner sides of the first rotary shaft 16 and the second rotary shaft 15, and the center shaft 42 abuts against the output shaft 24 in the axial direction.

According to one aspect of the embodiments of the disclosure, the speed reduction assembly further has a bearing 29 disposed on a radial outer side of the output shaft.

According to one aspect of the embodiments of the disclosure, the motor is an axial flux motor.

According to another aspect of the embodiments of the disclosure, an electromechanical device is provided and has the reduction gear described on any aspect of the aforementioned embodiment.

According to the exemplary embodiments of the disclosure, the gear of the speed reducer which is in serial arrangement with the dual-rotor motor in the axial direction is located on the radial outer side of one bearing close to the speed reduction assembly, so that the dual-rotor motor and the speed reducer may be compactly arranged in the axial direction and the radial direction, and accordingly the reduction gear which is small in size and high in drive capability is obtained. Meanwhile, the motor housing is not arranged between the dual-rotor motor and the speed reduction assembly, so that the number of mechanical parts may be decreased, accordingly the cost is reduced, and the axial size of the reduction gear is further reduced.

These and further aspects and features of the embodiments of the disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of the disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of the disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In addition, for convenience of explanation, in the following descriptions of the embodiments of the disclosure, a radius direction with the central axis of a first rotary shaft and a second rotary shaft of a motor as a center is called as the 'radial direction'; a direction around the central axis is called as the 'circumferential direction'; the extension direction of the central axis and a direction parallel to the extension direction of the central axis are called as the 'axial direction'; and in the axial direction, a direction in which the motor is directed toward a speed reduction assembly is called as 'front', and a direction opposite to 'front' is called as ' back'.

Embodiment 1

Figure 2:
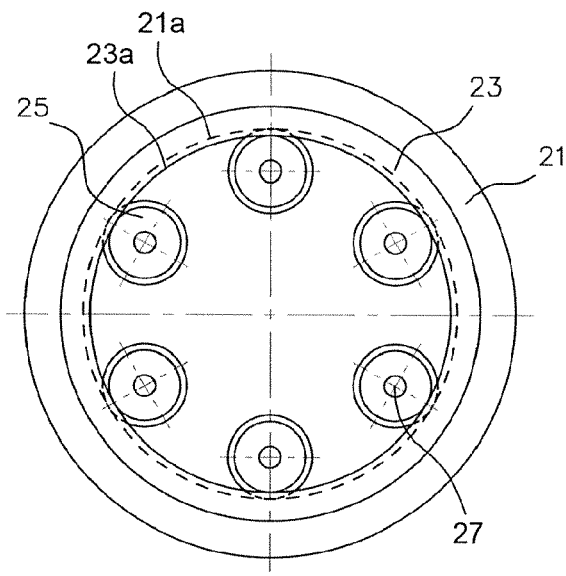
FIG. 2 is a top view of a speed reduction assembly of the reduction gear according to embodiment 1 of the disclosure.
Figure 3:
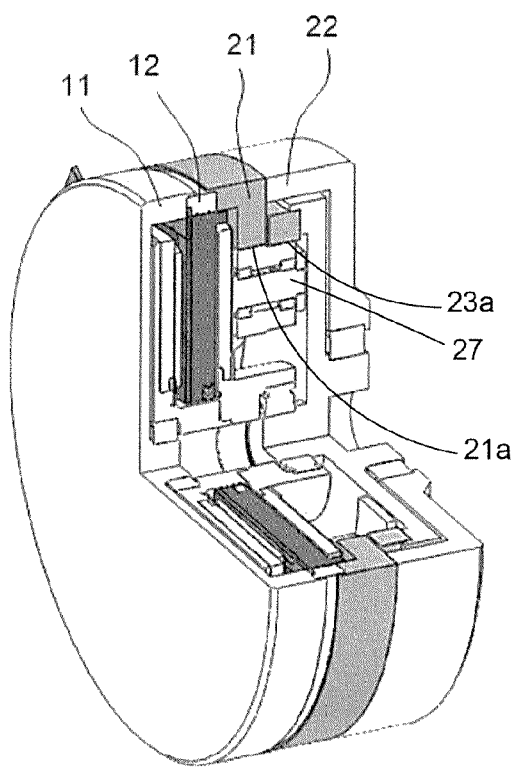
FIG. 3 is a three-dimensional sectional view of the reduction gear according to embodiment 1 of the disclosure.

The embodiment of the disclosure provides a reduction gear. FIG. 1 is a schematic sectional view of the reduction gear in an axial direction, FIG. 2 is a top view of a speed reduction assembly of the reduction gear, and FIG. 3 is a three-dimensional sectional view of the reduction gear.

As shown in FIG. 1, the reduction gear 10 has a motor 1 and the speed reduction assembly 2.

The motor 1 has a first rotary shaft 16 and a second rotary shaft 15 which rotate around a central axis C, a second rotor 14 disposed on a radial outer side of the second rotary shaft 15, a first rotor 13 disposed on a radial outer side of the first rotary shaft 16, and a stator 12 disposed between the second rotor 14 and the first rotor 13, namely, in an axial direction, the first rotor 13 is located on the back side of the stator 12, and the second rotor 14 is located on the front side of the stator 12.

The motor 1 further has a first motor housing 11 disposed on an axial side, away from the stator 12, of the first rotor 13, a first bearing 17 disposed on a radial inner side of the first rotary shaft 16, and a second bearing 18 disposed on a radial inner side of the second rotary shaft 15, where the first motor housing 11 is located on the back side of the stator 12, the first bearing 17 and the second bearing 18 are located on two sides of the stator 12 in the axial direction, namely, the first bearing 17 is located on the back side of the stator 12, the second bearing 18 is located on the front side of the stator 12, and the first rotary shaft 16 may be assembled on the first motor housing 11 through the first bearing 17.

In the present embodiment, the speed reduction assembly 2 and the motor 1 are arranged in series in the axial direction, and the speed reduction assembly 2 is arranged on the front side of the motor 1.

As shown in FIG. 1, the speed reduction assembly 2 may have first gears 25 disposed on one side, away from the first rotor 13, of the second rotor 14 of the motor 1, a second gear 21, a third gear 23 and an output shaft 24, where the first gears 25 are located on the front side of the second rotor 14, the second gear 21 and the third gear 23 both mesh with the first gears 25, and the output shaft 24 is driven by the third gear 23.

As shown in FIG. 1, the first gears 25 rotate around rotary shafts 27, and the rotary shafts 27 are located on one side, away from the stator 12, of the second rotor 14, namely, the rotary shafts 27 are located on the front side of the second rotor 14.

In the present embodiment, the rotary shafts 27 are located in a space of the radial outer side of the second bearing 18, so that the speed reduction assembly 2 is disposed by effectively utilizing the space around the second bearing 18, and accordingly the reduction gear which is compact in structure in the axial direction and the radial direction is obtained.

In the present embodiment, the motor 1 does not have a front housing, therefore, no housing structure is arranged between the speed reduction assembly 2 and the motor 1, the number of mechanical parts may be decreased, and accordingly the cost is reduced, and the axial size of the reduction gear is further reduced.

In the present embodiment, as shown in FIG. 1, the rotary shafts 27 may be fixed on a front side face of the second rotor 14, so that the second rotor 14 rotates to drive the rotary shafts 27 to revolve around the central axis C, which drives the first gear 25 to rotate, the first gears 25 rotate to drive the second gear 21 and the third gear 23 to rotate, and thus the output shaft 24 is driven to rotate. In addition, the output shaft 24 also may fix the axial position of the first gear 25 in the axial direction.

In the present embodiment, the motor 1 has the two rotors, and the motor 1 is an axial flux motor, so that the reduction gear may provide higher drive capability.

In the present embodiment, as shown in FIG. 1, the first rotary shaft 16 and the second rotary shaft 17 each may be of a hollow structure, so that the weights of the first rotary shaft 16 and the second rotary shaft 17 may be reduced. In addition, the first rotary shaft 16 and the second rotary shaft 17 may be connected together through a connection component to form a combined rotary shaft, and the connection component may be, for example, a bolt or another connection component.

In the present embodiment, the first rotary shaft 16 may be installed on the first motor housing 11 through the first bearing 17.

In the present embodiment, the second rotary shaft 15 may be assembled on the output shaft 24 through the second bearing 18, namely, the second bearing 18 is located between the second rotary shaft 15 and the output shaft 24.

In one implementation, the second rotary shaft 15 is located on the radial outer side of the second bearing 18. For example, as shown in FIG. 1, the second bearing 18 is located on the radial inner side of the second rotary shaft 15, and the output shaft 24 is located on the radial inner side of the second bearing 18.

In FIG. 1, the second rotary shaft 15 has a first concave portion 15a, and the second bearing 18 is located in the first concave portion 15a. As shown in FIG. 1, on one side back on to the first motor housing 11 (namely, on the front side of the motor 1), an end face of the second rotary shaft 15 is farther away from the first motor housing 11 than an end face of the second bearing 18, or, the end face of the second rotary shaft 15 coincides with the end face of the second bearing 18. Therefore, the axial size of the reduction gear 10 cannot be increased by the design of the second bearing 18.

Figure 4:
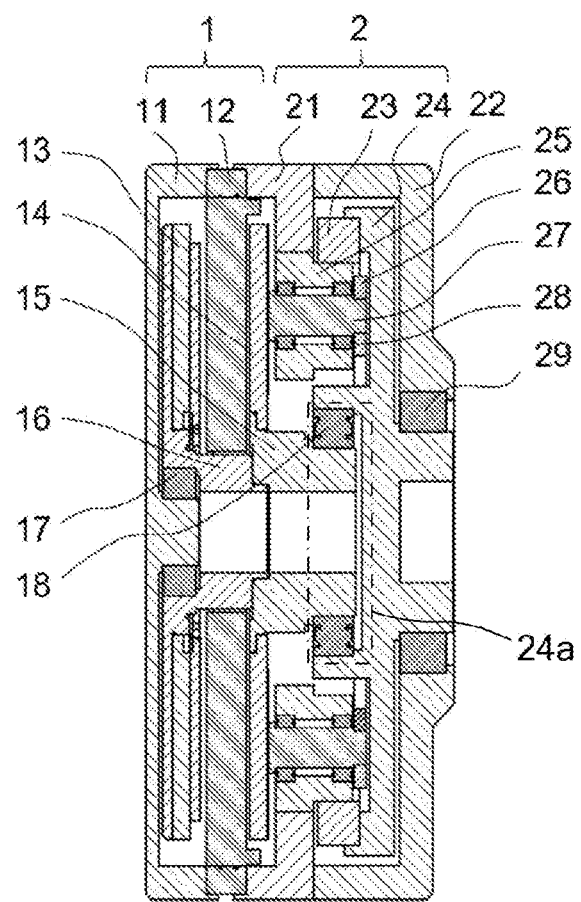
FIG. 4 is another schematic sectional view of the reduction gear in the axial direction according to embodiment 1 of the disclosure.

In another implementation, the output shaft 24 is located on the radial outer side of the second bearing 18. For example, FIG. 4 is another schematic sectional view of the reduction gear in the axial direction. In FIG. 4, the second bearing 18 is located on the radial inner side of the output shaft 24 of the speed reduction assembly 2, namely, the second bearing 18 is located on the radial inner side of the output shaft 24, and the second rotary shaft 15 is located on the radial inner side of the second bearing 18.

In FIG. 4, the output shaft 24 has a second concave portion 24a on a radial inner side, and the second bearing 18 is located in the second concave portion 24a. As shown in FIG. 4, on the side facing toward the first motor housing 11, the front end face of the output shaft 24 is closer to the first motor housing 11 than the front end face of the second bearing 18, or, the front end face of the output shaft 24 coincides with the front end face of the second bearing 18. Therefore, the axial size of the reduction gear 10 cannot be increased by the design of the second bearing 18.

In addition, in the present embodiment, the same mark numbers in FIG. 4 and FIG. 1 represent the same components, so FIG. 4 is no longer explained independently.

In the present embodiment, as shown in FIG. 1, supports 26 are arranged between the output shaft 24 and the first gears 25, the supports 26 abut against the rotary shafts 27 of the first gears 25, and are used for fixing the rotary shafts 27 from the front ends of the rotary shafts 27, so that stability of the whole reduction gear 10 is improved.

In the present embodiment, as shown in FIG. 1, the first gears 25 may be assembled on the radial outer sides of the rotary shafts 27 through bearings 28, and the bearings 28 may be shaft sleeve bearings or ball bearings.

In the present embodiment, as shown in FIG. 2, the number of the first gears 25 are two or more, the two or more first gears 25 are disposed with the central axis C as a center, and each first gear 25 rotates around the respective rotary shaft 27. The number of the first gears 25 may be determined according to a speed reduction ratio the speed reduction assembly needs to obtain. In one implementation, the number of the first gears 25 may be two to ten, for example, the number of the first gears 25 is six in FIG. 2.

In the present embodiment, as shown in FIG. 1, the first gears 25 may be planet gears, and the second gear 21 and the third gear 23 may be ring gears, where the tooth numbers and shifting coefficients of the second gear 21 and the third gear 23 are different respectively.

In FIG. 1, the second gear 21 is installed on the stator 12, and the stator 12 may be fixed to the first motor housing 11 through a connection component such as a bolt. The third gear 23 and the second rotary shaft 15 rotate in the same direction. The third gear 23 is assembled on the output shaft 24, and the output shaft 24 rotates by virtue of the bearing 29 and the second bearing 18, where the bearing 29 is arranged on a front housing 22 of the reduction gear.

As shown in FIG. 1, FIG. 2 and FIG. 3, the inner diameter of the second gear 21 and the inner diameter of the third gear 23 are different, so that the speed reduction ratio of the speed reduction assembly 2 may be adjusted more flexibly. For example, the inner diameter of the second gear 21 is greater than that of the third gear 23, namely, a radial inner end 21a of the second gear 21 is located on the radial outer side of a radial inner end 23a of the third gear 23. In addition, the present embodiment may be not limited thereto, for example, the inner diameter of the second gear 21 may be smaller than that of the third gear 23.

In the present embodiment, as shown in FIG. 1, when the inner diameter of the second gear 21 and the inner diameter of the third gear 23 are different, the first gears 25 are plurality planet gears of which the radii change in the axial direction. Each plurality planet gear may be an independent gear or is formed by assembling two independent pinions in the axial direction.

In the present embodiment, when the second gear 21 and the third gear 23 are ring gears, the inner diameter of the second gear 21 and the inner diameter of the third gear 23 may also be the same.

Figure 5:
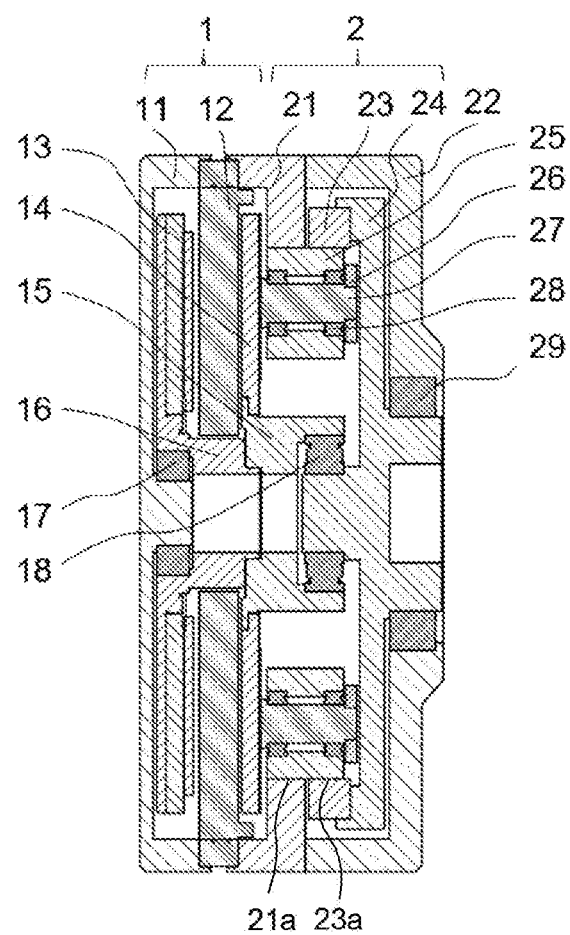
FIG. 5 is another schematic sectional view of the reduction gear in the axial direction according to embodiment 1 of the disclosure.
Figure 6:
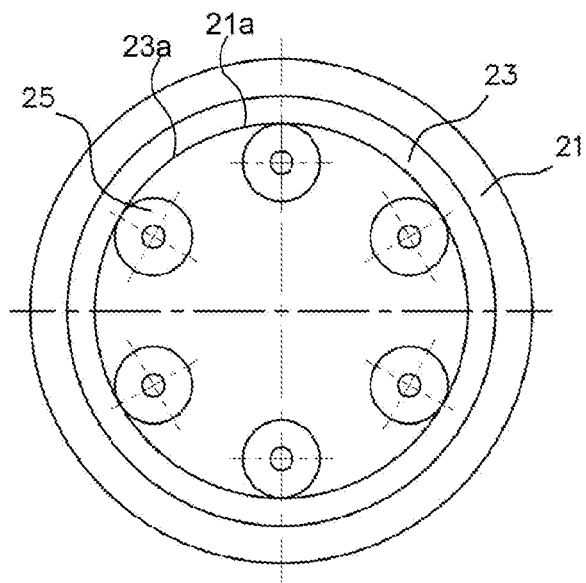
FIG. 6 is a top view of the speed reduction assembly of the reduction gear according to embodiment 1 of the disclosure.

FIG. 5 is another schematic sectional view of the reduction gear in the axial direction according to an embodiment of the disclosure. FIG. 6 is a top view of the speed reduction assembly of the reduction gear. As shown in FIG. 5 and FIG. 6, the inner diameter of the second gear 21 and the inner diameter of the third gear 23 are the same, namely, the radial inner end 21a of the second gear 21 and the radial inner end 23a of the third gear 23 are the same in position in the radial direction.

In FIG. 5, when the inner diameter of the second gear 21 and the inner diameter of the third gear 23 are the same, the first gears 25 are singularity planet gears of which the radii keep fixed in the axial direction. The singularity planet gears are independent gears.

In addition, in FIG. 5 and FIG. 6, the drawing mark numbers the same as those in FIG. 1 and FIG. 2 represent the same components.

Figure 7:
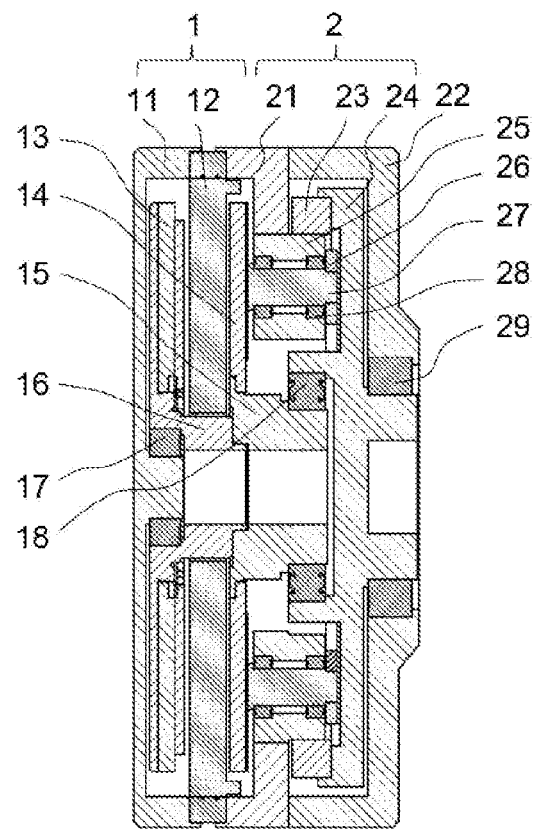
FIG. 7 is another schematic sectional view of the reduction gear in the axial direction according to embodiment 1 of the disclosure.

FIG. 7 is another schematic sectional view of the reduction gear in the axial direction according to an embodiment of the disclosure. The difference between FIG. 7 and FIG. 1 lies in that: in FIG. 7, the second bearing 18 is located on the radial outer side of the second rotary shaft 15, and also located on the radial inner side of the output shaft 24.

According to the present embodiment, in the reduction gear, the two bearings of the dual-rotor motor are arranged on two sides of the stator in the axial direction, and a gear of a speed reducer which is in serial arrangement with the dual-rotor motor in the axial direction is located on the radial outer side of one bearing close to the speed reduction assembly, so that the dual-rotor motor and the speed reducer may be compactly arranged in the axial direction and the radial direction, and accordingly the reduction gear which is small in size and high in drive capability is obtained. Meanwhile, a motor housing is not arranged between the dual-rotor motor and the speed reduction assembly, so that the number of mechanical parts may be decreased, accordingly the cost is reduced, and the axial size of the reduction gear is further reduced.

Embodiment 2

The embodiment of the disclosure provides a reduction gear. The difference between the reduction gear in the embodiment 2 and the reduction gear in the embodiment 1 lies in that the structures of speed reduction assemblies are different.

Figure 8:
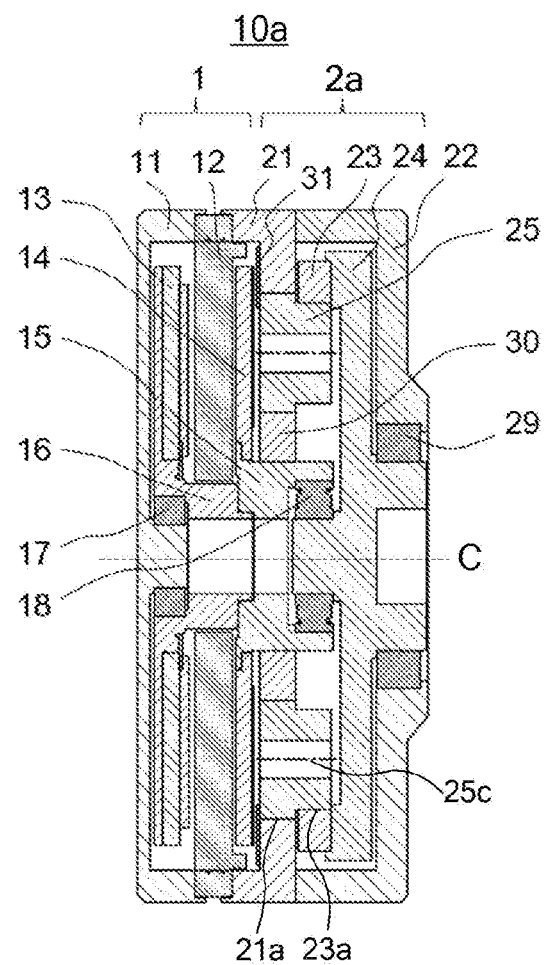
FIG. 8 is a schematic sectional view of a reduction gear in the axial direction according to embodiment 2 of the disclosure.
Figure 9:
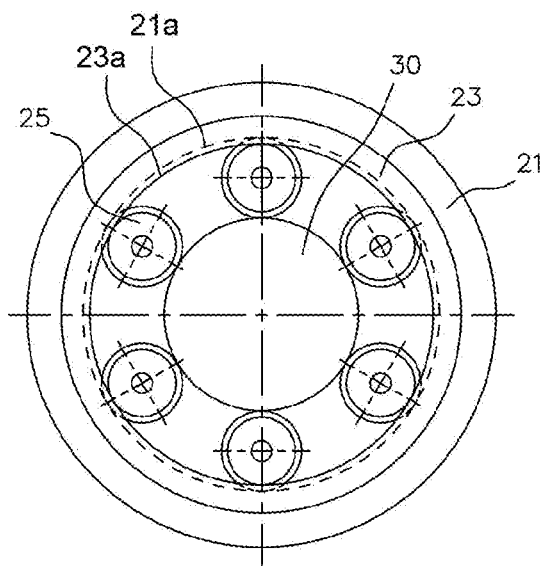
FIG. 9 is a top view of a speed reduction assembly of the reduction gear according to embodiment 2 of the disclosure.
Figure 10:
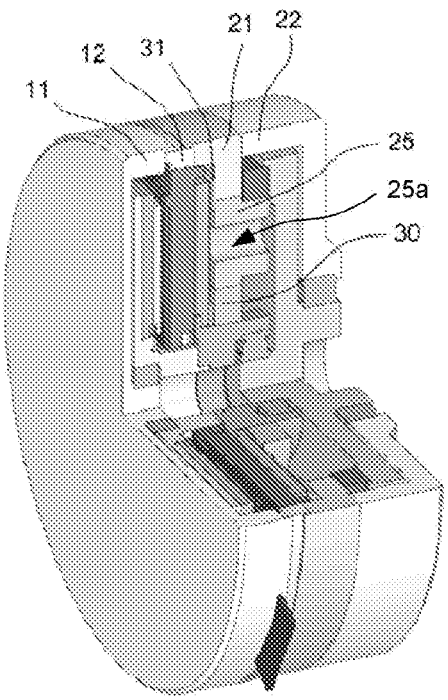
FIG. 10 is a three-dimensional sectional view of the reduction gear according to embodiment 2 of the disclosure.

FIG. 8 is a schematic sectional view of the reduction gear in the axial direction. FIG. 9 is a top view of the speed reduction assembly of the reduction gear. FIG. 10 is a three-dimensional sectional view of the reduction gear.

As shown in FIG. 8, the reduction gear 10a has a motor 1 and a speed reduction assembly 2a, where the motor 1 is the same as the motor 1 in the embodiment 1, and the speed reduction assembly 2a is different from the speed reduction assembly 2 in the embodiment 1.

As shown in FIG. 8, one difference between the speed reduction assembly 2a and the speed reduction assembly 2 in the embodiment 1 lies in that in addition to having first gears 25, a second gear 21 and a third gear 23, the speed reduction assembly 2a further has a fourth gear 30, where the second gear 21 and the third gear 23 serve as ring gears. As shown in FIG. 8 and FIG. 9, the fourth gear 30 is located on the radial inner side of the first gears 25, and meanwhile, the fourth gear 30 meshes with the first gears 25. The fourth gear 30 is, for example, a sun gear.

As shown in FIG. 8, another difference between the speed reduction assembly 2a and the speed reduction assembly 2 in the embodiment 1 lies in that the speed reduction assembly 2a further has a collar 31 and the speed reduction assembly 2a does not have rotary shafts 27, bearings 28 and supports 26. For example, an arrow 25a in FIG. 10 shows an inner wall 25a of one first gear 25, and the radial inner side of the inner wall 25a is not provided with one rotary shaft 27 in the embodiment 1. The collar 31 is arranged at an axial end, facing toward a second rotor 14, of the second gear 21 and extends toward the radial inner side, so that a part, closer to the radial inner side than the second gear 21, of the collar 31 abuts against ends, facing towards the second rotor 14, of the first gears 25, namely, in the speed reduction assembly 2a, the first gears 25 are supported on the collar 3, and the first gears 25 may slide on the collar 31, so as to revolve around the central axes C and rotate around a central axis 25c of the first gears 25.

In the present embodiment, as shown in FIG. 8, the fourth gear 30 may rotate along with rotation of a second rotary shaft 15, for example, the fourth gear 30 is fixed to the second rotary shaft 15, so that rotation energy of the second rotary shaft 15 is transmitted to the first gears 25 through the fourth gear 30, and thus transmitted to the third gear 23 and an output shaft 24 through the first gears 25.

Figure 11:
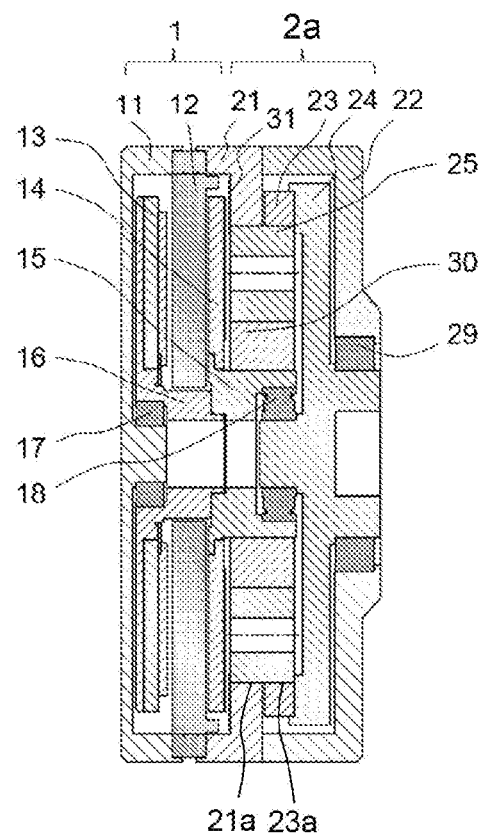
FIG. 11 is another schematic sectional view of the reduction gear in the axial direction according to embodiment 2 of the disclosure.
Figure 12:
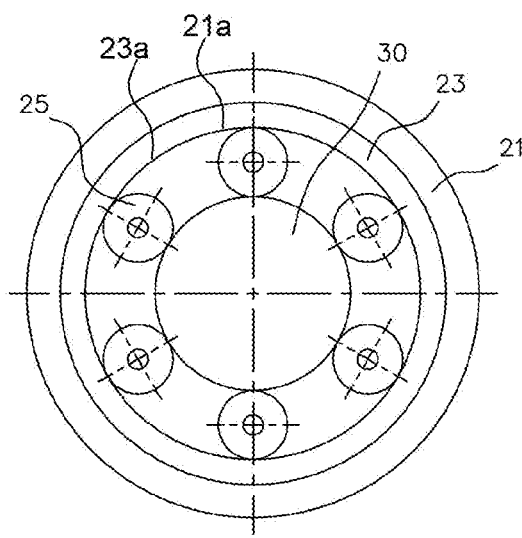
FIG. 12 is another top view of the speed reduction assembly of the reduction gear according to embodiment 2 of the disclosure.

FIG. 11 is another schematic sectional view of the reduction gear in the axial direction according to the present embodiment. FIG. 12 is another top view of the speed reduction assembly of the reduction gear. The difference between FIG. 11, FIG. 12 and FIG. 8, FIG. 9 lies in that: in the implementation of FIG. 8 and FIG. 9, the inner diameter of the second gear 21 and the inner diameter of the third gear 23 are different, namely, a radial inner end 21a of the second gear 21 and a radial inner end 23a of the third gear 23 are different in position in the radial direction (as shown in FIG. 9), and the first gears 25 are plurality planet gears; however, in the implementation of FIG. 11 and FIG. 12, the inner diameter of the second gear 21 and the inner diameter of the third gear 23 are the same, namely, the radial inner end 21a of the second gear 21 and the radial inner end 23a of the third gear 23 are the same in position in the radial direction (as shown in FIG. 12), and the first gears 25 are singularity planet gears.

In the present embodiment, the meanings of other drawing mark numbers in FIG. 8, FIG. 9, FIG. 10, FIG. 11 and FIG. 12 are the same as those in the embodiment 1.

The present embodiment may achieve the effects of the embodiment 1, and meanwhile, as the speed reduction assembly 2a does not have the rotary shafts 27, the bearings 28 and the supports 26, the number of the components of the reduction gear 10a is decreased, the weight is reduced, and cost is reduced.

Embodiment 3

The embodiment of the disclosure provides a reduction gear. The difference between the reduction gear in the embodiment 3 and the reduction gear in the embodiment 1 mainly lies in that the structures of speed reduction assemblies are different.

Figure 13:
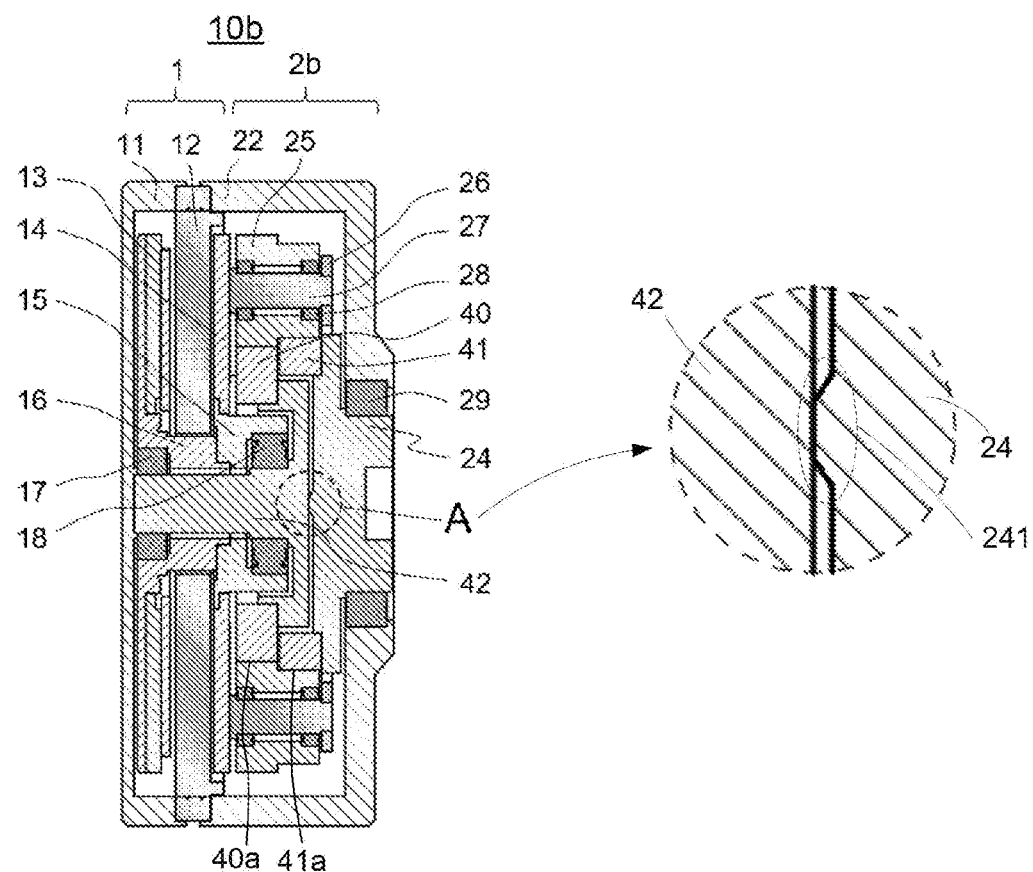
FIG. 13 is a schematic sectional view of a reduction gear in the axial direction according to embodiment 3 of the disclosure.
Figure 14:
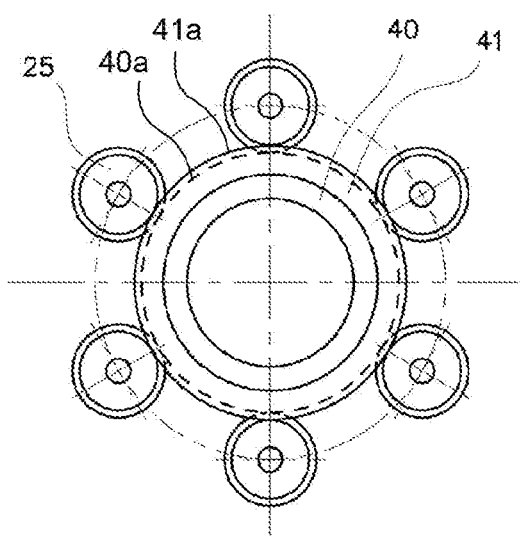
FIG. 14 is a top view of a speed reduction assembly of the reduction gear according to embodiment 3 of the disclosure.
Figure 15:
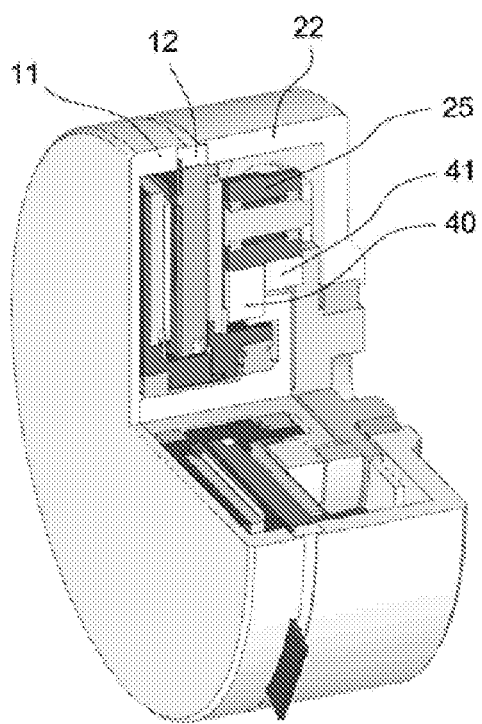
FIG. 15 is a three-dimensional sectional view of the reduction gear according to embodiment 3 of the disclosure.

FIG. 13 is a schematic sectional view of the reduction gear in the axial direction. FIG. 14 is a top view of the speed reduction assembly of the reduction gear. FIG. 15 is a three-dimensional sectional view of the reduction gear.

As shown in FIG. 13, a reduction gear 10b has a motor 1 and a speed reduction assembly 2b. The structure of the motor 1 and the structure of the motor 1 in the embodiment 1 are the same, and the structure of the speed reduction assembly 2b is different from that of the speed reduction assembly 2 in the embodiment 1.

As shown in FIG. 13, one difference between the speed reduction assembly 2b and the speed reduction assembly 2 in the embodiment 1 lies in that: a second gear 40 and a third gear 41 of the speed reduction assembly 2b are sun gears, and the speed reduction assembly 2b further has a center shaft 42, where the second gear 40 is fixed to the center shaft 42, the back end of the center shaft 42 is fixed to a first motor housing 11, and the center shaft 42 is located on the radial inner side of a first rotary shaft 16 and a second rotary shaft 15. In addition, the tooth numbers and shifting coefficients of the second gear 40 and the third gear 41 may be different respectively.

As shown in FIG. 13, another difference between the speed reduction assembly 2b and the speed reduction assembly 2 in the embodiment 1 lies in that an output shaft 24 abuts against the center shaft 42 in the axial direction. For example, as shown in an enlarged view of a local area A of FIG. 13, the back end of the output shaft 24 has a protrusion 241 facing toward the center shaft 42 in the axial direction, and the protrusion 241 abuts against the front end of the center shaft 42, so that the output shaft 24 is positioned in the axial direction. In FIG. 13, the cross section of the protrusion 241 in the axial direction is trapezoidal, but the present embodiment is not limited thereto, and the cross section of the protrusion 241 in the axial direction may also be in another shape, for example, a rectangular shape or an arc shape or the like.

In the present embodiment, the output shaft 24 may be driven by the third gear 41, for example, the third gear 41 is fixed to the output shaft 24. In addition, rotary shafts 27 on the radial inner sides of first gears 25 may be fixed to a second rotor 14.

In the present embodiment, a first bearing 17 may be located between the radial directions of the center shaft 42 and the first rotary shaft 16, and a second bearing 18 may be located between the center shaft 42 and the second rotary shaft 15.

In the present embodiment, when the second rotor 14 rotates, the rotary shafts 27 are driven to revolve around the center shaft 42, so that the first gears 25 are driven to revolve and rotate around the rotary shafts 27, then movement of the first gears 25 is transmitted to the third gear 41, and the output shaft 24 is driven to rotate.

Figure 16:
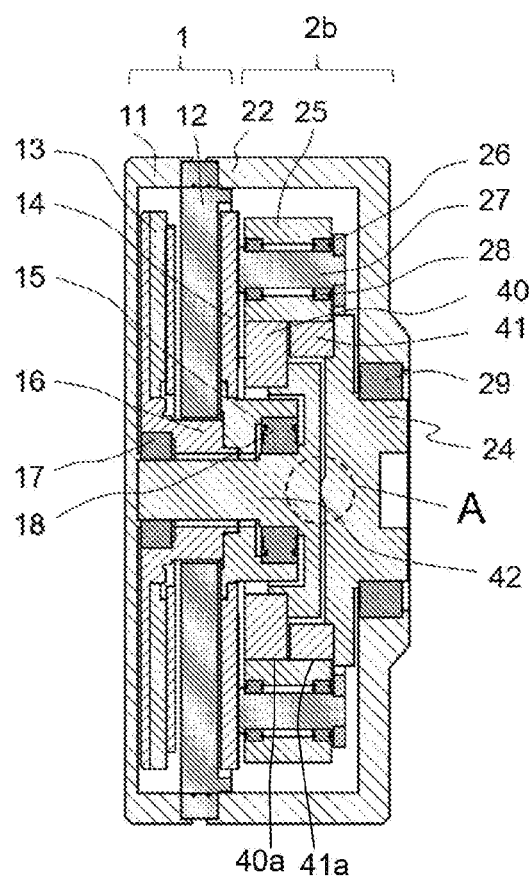
FIG. 16 is another schematic sectional view of the reduction gear in the axial direction according to embodiment 3 of the disclosure.
Figure 17:
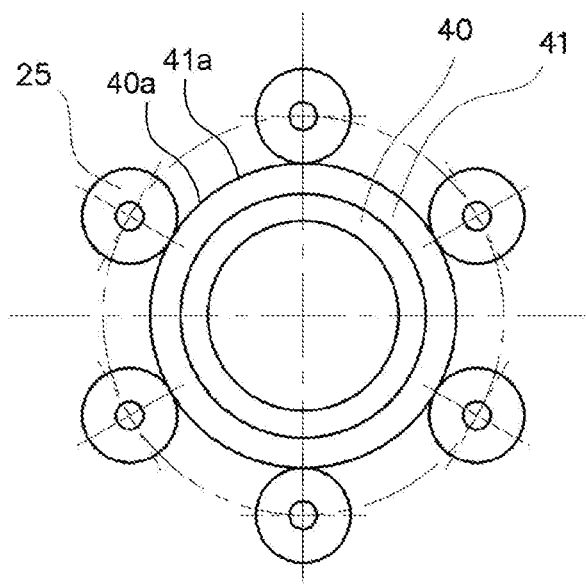
FIG. 17 is another top view of the speed reduction assembly of the reduction gear according to embodiment 3 of the disclosure.

FIG. 16 is another schematic sectional view of the reduction gear in the axial direction according to the present embodiment. FIG. 17 is another top view of the speed reduction assembly of the reduction gear. The difference between FIG. 16, FIG. 17 and FIG. 13, FIG. 14 lies in that: in the implementation of FIG. 13 and FIG. 14, the outer diameter of the second gear 40 and the outer diameter of the third gear 41 are different, namely, a radial outer end 40a of the second gear 40 and a radial outer end 41a of the third gear 41 are different in position in the radial direction (as shown in FIG. 13), and the first gears 25 are plurality planet gears; however, in the implementation of FIG. 16 and FIG. 17, the outer diameter of the second gear 40 and the outer diameter of the third gear 41 are the same, namely, the radial outer end 40a of the second gear 40 and the radial outer end 41a of the third gear 41 are the same in position in the radial direction (as shown in FIG. 16), and the first gears 25 are singularity planet gears. In addition, an enlarged view of a local area A of FIG. 16 is the same as that of FIG. 13, and therefore the enlarged view is omitted in FIG. 16.

Figure 18:
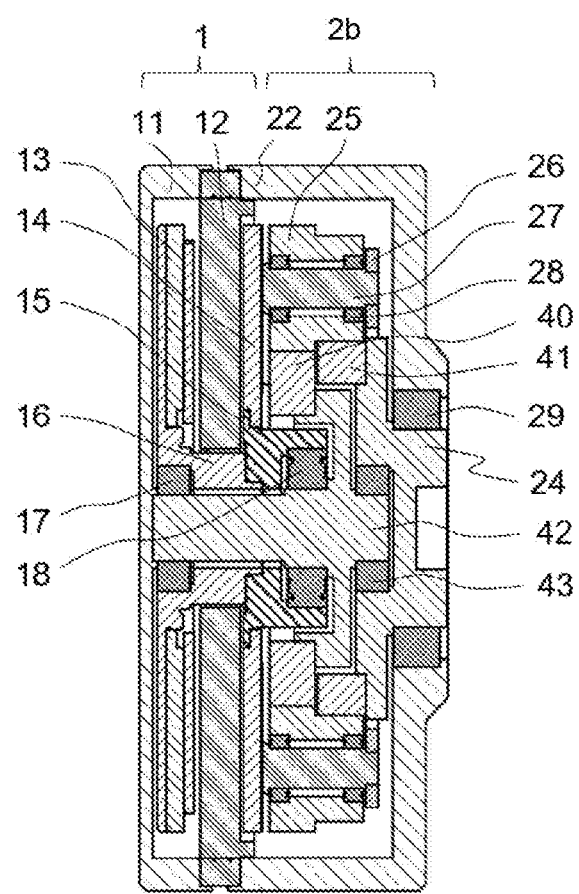
FIG. 18 is still another schematic sectional view of the reduction gear in the axial direction according to embodiment 3 of the disclosure.

FIG. 18 is another schematic sectional view of the reduction gear in the axial direction according to the present embodiment. The difference between FIG. 18 and FIG. 13 lies in that: the reduction gear 10b in FIG. 18 further has a bearing 43. The bearing 43 may be located between the radial directions of the output shaft 24 and the center shaft 42, so that the output shaft 24 is positioned in the radial direction through the bearing 43, and thereby the output shaft 24 may operate more stably. In addition, the output shaft 24 may also be positioned in the axial direction through the bearing 43. In the reduction gear in FIG. 18, the output shaft 24 may also have a protrusion 241 shown in FIG. 13, so that the output shaft 24 may be axially positioned through any one of the bearing 43 and the protrusion 241.

Figure 19:
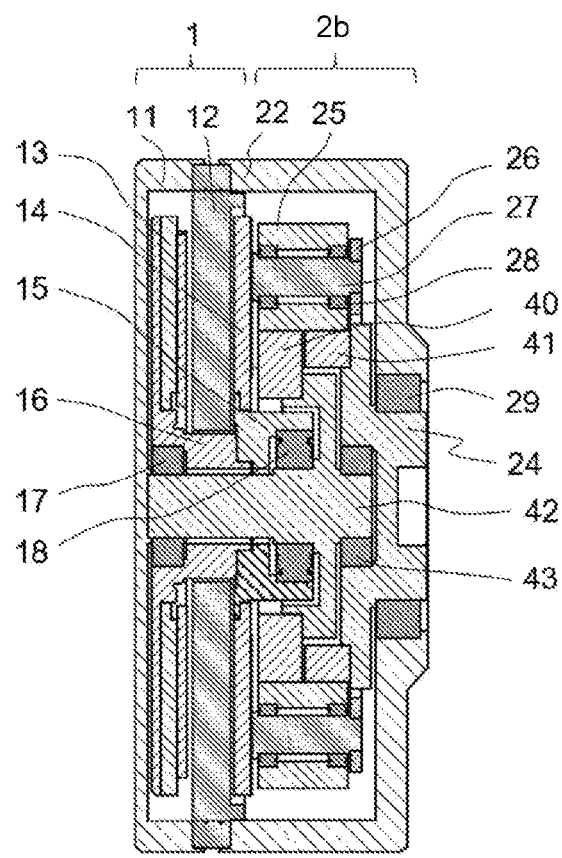
FIG. 19 is still another schematic sectional view of the reduction gear in the axial direction according to embodiment 3 of the disclosure.

FIG. 19 is another schematic sectional view of the reduction gear in the axial direction according to the present embodiment. The difference between FIG. 19 and FIG. 18 lies in that: in an implementation of FIG. 18, the outer diameters of the second gear 40 and the third gear 41 are different, and the first gears 25 are plurality planet gears; and in an implementation of FIG. 19, the outer diameters of the second gear 40 and the third gear 41 are the same, and the first gears 25 are singularity planet gears.

In the present embodiment, the meanings of other drawing mark numbers in FIG. 13, FIG. 14, FIG. 15, FIG. 16, FIG. 17, FIG. 18 and FIG. 19 are the same as those in the embodiment 1.

The present embodiment may achieve the same effect as that of the embodiment 1.

Embodiment 4

The embodiment 4 of the disclosure provides an electromechanical device, which has the reduction gear described in the embodiment 1, 2 or 3. Since the structure of the reduction gear has been described in detail in the embodiment 1, 2 or 3, the content thereof is incorporated herein, and the description is omitted.

According to the present embodiment, two bearings of a dual-rotor motor are arranged on two sides of a stator in an axial direction, a gear of a speed reducer which is in serial arrangement with the dual-rotor motor in the axial direction is located on a radial outer side of one bearing close to a speed reduction assembly, so that the dual-rotor motor and the speed reducer may be compactly arranged in the axial direction and the radial direction, and accordingly the reduction gear which is small in size and high in drive capability is obtained. Meanwhile, a motor housing is not arranged between the dual-rotor motor and the speed reduction assembly, so that the number of mechanical parts may be decreased, accordingly the cost is reduced, and the axial size of the reduction gear is further reduced. Furthermore, the electromechanical device which is compact in structure, high in drive capability and low in cost may be obtained.

The disclosure is described above with reference to particular embodiments. However, it should be understood by those skilled in the art that such a description is illustrative only, and not intended to limit the protection scope of the disclosure. Various variations and modifications may be made by those skilled in the art according to the principle of the disclosure, and such variants and modifications fall within the scope of the disclosure.

What is claimed is:
1. A reduction gear, comprising a motor and a speed reduction assembly, wherein the motor comprises:
    a first rotary shaft and a second rotary shaft which rotate around a central axis,
    a second rotor and a first rotor which are disposed on radial outer sides of the second rotary shaft and the first rotary shaft respectively,
    a stator disposed between the second rotor and the first rotor, and
    a first motor housing disposed on an axial side, away from the stator, of the first rotor;
the speed reduction assembly comprises
    a first gear disposed on one side, away from the first rotor, of the second rotor,
    a second gear and a third gear which mesh with the first gears, and
    an output shaft driven by the third gear; and
the motor further comprises:
    a first bearing disposed on a radial inner side of the first rotary shaft, and
    a second bearing disposed on a radial inner side of the second rotary shaft or the output shaft,
    the first bearing and the second bearing are located on two sides of the stator in an axial direction, and
    the first gear is located on one side, away from the stator, of the second rotor, wherein the second bearing is disposed on the radial inner side of the first gears, the second gear and the third gear, and at least a part of the second bearing overlaps with the first gear in a radial direction of the reduction gear.

2. The reduction gear according to claim 1, wherein
the second rotary shaft comprises a first concave portion, and
the second bearing is located inside the first concave portion.

3. The reduction gear according to claim 2, wherein
on a side back on to the first motor housing,
an end face of the second rotary shaft is farther away from the first motor housing than an end face of the second bearing, or, the end face of the second rotary shaft coincides with the end face of the second bearing.

4. The reduction gear according to claim 1, wherein
the output shaft comprises a second concave portion on a radial inner side, and
the second bearing is located in the second concave portion.

5. The reduction gear according to claim 4, wherein
on a side facing toward the first motor housing,
an end face of the output shaft is closer to the first motor housing than an end face of the second bearing, or, the end face of the output shaft coincides with the end face of the second bearing.

6. The reduction gear according to claim 1, wherein
a support is further arranged between the output shaft and the first gear, the support abuts against a rotary shaft of the first gear, the first gear rotates around the rotary shaft, and the rotary shaft is fixed to the second rotor.

7. The reduction gear according to claim 1, wherein
two or more first gears are provided, and the two or more first gears are disposed with the central axis as a center.

8. The reduction gear according to claim 7, wherein
the second gear and the third gear are ring gears or sun gears, and the first gears are planet gears.

9. The reduction gear according to claim 8, wherein
when the second gear and the third gear are the ring gears, an inner diameter of the second gear and an inner diameter of the third gear are the same or different; and
when the second gear and the third gear are the sun gears, an outer diameter of the second gear and an outer diameter of the third gear are the same or different.

10. The reduction gear according to claim 8, wherein
when the second gear and the third gear are the ring gears, the reduction gear further comprises a fourth gear, and the fourth gear is a sun gear and located on a radial inner side of the first gears.

11. The reduction gear according to claim 10, wherein
the reduction gear further comprises a collar which is arranged at an end, facing the second rotor, of the second gear and abuts against ends, facing the second rotor, of the first gears.

12. The reduction gear according to claim 1, wherein
the second bearing is located between radial directions of the second rotary shaft and the output shaft.

13. The reduction gear according to claim 1, wherein
the reduction gear is further provided with a center shaft, the center shaft is located on radial inner sides of the first rotary shaft and the second rotary shaft, and
the center shaft abuts against the output shaft in the axial direction.

14. The reduction gear according to claim 1, wherein
the speed reduction assembly further comprises: a bearing disposed on a radial outer side of the output shaft.

15. The reduction gear according to claim 1, wherein
the motor is an axial flux motor.

16. An electromechanical device, wherein
the electromechanical device comprises the reduction gear of claim 1.

\* \* \* \* \*